(12) United States Patent
Schmalzl et al.

(10) Patent No.: US 7,521,490 B2
(45) Date of Patent: Apr. 21, 2009

(54) WAXES FOR PRODUCING PRINTING INKS

(75) Inventors: Manfred Schmalzl, Karlsfeld (DE); Gabriele Sluiter, Binswangen (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 565 days.

(21) Appl. No.: 10/220,411

(22) PCT Filed: Feb. 15, 2001

(86) PCT No.: PCT/EP01/01667

§ 371 (c)(1),
(2), (4) Date: Aug. 29, 2005

(87) PCT Pub. No.: WO01/64799

PCT Pub. Date: Sep. 7, 2001

(65) Prior Publication Data

US 2006/0009542 A1    Jan. 12, 2006

(30) Foreign Application Priority Data

Mar. 1, 2000    (DE)  ................................. 100 09 754
Dec. 20, 2000   (DE)  ................................. 100 63 424

(51) Int. Cl.
*C09D 11/00* (2006.01)
(52) U.S. Cl. ...................................... 523/160; 523/161
(58) Field of Classification Search ................ 523/160, 523/161
See application file for complete search history.

(56) References Cited

U.S. PATENT DOCUMENTS

| | | | |
|---|---|---|---|
| 5,591,796 A | 1/1997 | Wisniewski et al. | 524/484 |
| 5,643,984 A | 7/1997 | Mueller et al. | 524/272 |
| 5,749,949 A | 5/1998 | Tavares | 106/313 |
| 5,875,720 A | 3/1999 | Weiss et al. | 101/488 |
| 5,998,547 A | 12/1999 | Hohner | 525/301 |
| 6,080,902 A | 6/2000 | Herrmann et al. | 585/512 |
| 6,107,530 A | 8/2000 | Hohner et al. | 585/9 |
| 6,211,303 B1 | 4/2001 | Hohner | 525/388 |

FOREIGN PATENT DOCUMENTS

| | | |
|---|---|---|
| DE | 1 520 914 | 1/1970 |
| DE | 44 03 478 | 8/1995 |
| EP | 0 324 077 | 7/1989 |
| EP | 0 571 882 | 12/1993 |
| EP | 0 632 063 | 1/1995 |
| EP | 0 890 619 | 1/1999 |
| GB | 1 056 175 | 1/1937 |

OTHER PUBLICATIONS

English abstract for EP 0324077, Jul. 19, 1989, Kuhnle, et al.
English abstract for EP 0571882, Dec. 1, 1993, Herrmann, et al.
U.S. Appl. No. 11/586,376, by Heinrichs et al. filed Oct. 25, 2006.
English Translation of PCT International Preliminary Examination Report for PCT/EP01/01667, Jun. 6, 2002.

*Primary Examiner*—Edward J Cain
(74) *Attorney, Agent, or Firm*—Anthony A. Bisulca

(57) ABSTRACT

The invention relates to mixtures for producing printing inks, wherein the mixtures comprise a homopolymerizate or copolymerizate of $C_2$-$C_{18}$-α-olefins, which are produced by means of metallocene catalysis, and of decomposing waxes, which are prepared from polyolefins of longer chain lengths produced by means of metallocene catalysis, and one or more additional additive.

10 Claims, No Drawings

WAXES FOR PRODUCING PRINTING INKS

The present invention relates to the use of polyolefin waxes prepared by means of metallocene catalysts, in combination with PTFE, amide wases, montan waxes, natural plant waxes, sorbitol esters, synthetic hydrocarbon waxes, microcrystalline and macrocrystalline paraffins, polar polyolefin waxes, polyamides, polyolefins and/or wetting agents, as an additive component in printing inks.

The function of waxes in printing inks is to increase the resistance of printed products to abrasion, scuffing and scratching. The waxes are usually used in the form of solvent dispersions or solvent pastes or else in solid micronized form. Micronization is done either by milling on appropriate mills or spraying from the melt, in each case with subsequent classification if desired. The average particle sizes required are generally below 10 µm.

To date, waxes from different kinds of preparation processes have been used for this application. Besides the thermal degradation of high molecular mass polyolefins or free-radical polymerization of ethylene at high pressures and temperatures, a common method of preparing waxes is by homopolymerization or copolymerization of ethylene or propylene using Ziegler-Natta catalysts comprising a titanium compound as the catalytically active species, as disclosed, for example, in DE-A-1 520 914.

EP-A-0 890 619 discloses how in particular the use of metallocene catalyst systems for the preparation of polyolefin waxes leads to materials which when used inprinting inks bring about improved scuff protection effects.

The use of the straight polyolefin waxes prepared by means of metallocene catalysis in printing inks covers the basic requirements in relation to enhanced scuff protection relative to the original ink. Over and above this, however, there are applications which demand specifically improved scuff protection or high surface lubricity or good overprintability, e.g., when printing abrasive, matt-coated papers, or in the packaging printing sector.

It has surprisingly now been found that polyolefin waxes, prepared using metallocene catalysts and combined with additives, meet this heightened profile of requirements in a particular way.

The present invention provides for the use of mixtures of
a) homopolymer or copolymer of $C_2$-$C_{18}$ α-olefins, prepared using metallocene catalysis, and also degradation waxes, prepared from longer-chain polyolefins produced using metallocene catalysis, with one or more further additives selected from the group consisting of
b) polytetrafluoroethylene having a molecular weight ($M_n$) of between 30 000 and 2 000 000 g/mol,
c) thermoplastic PTFE having a molecular weight (Mn) of between 500 000 and 10 000 000 g/mol, whose particle size is situated in the range 1-100 µm,
d) amide waxes prepared by reacting ammonia or ethylenediamine with saturated and unsaturated fatty acids,
e) montan waxes, including acid waxes and ester waxes having a carbon chain length of the carboxylic acid of from $C_{22}$ to $C_{36}$,
f) natural plant waxes,
g) reaction products of sorbitol with saturated and/or unsaturated fatty acids and/or montanic acids,
h) synthetic hydrocarbons,
i) paraffins and microcrystalline waxes obtained in the course of petroleum refining,
j) polar polyolefin waxes prepared by oxidizing ethylene or propylene homopolymer and copolymer waxes or grafting them with maleic anhydride,
k) polyamides whose particle size is situated in the range 1-100 µm,
l) polyolefins, such as, for example, polyethylene, polypropylene or copolymers thereof of high or low density having molecular weights (Mn) of between 10 000 and 1 000 000 g/mol whose particle size is situated in the range 1-100 µm,
m) agents which in general lower the surface tension of liquids (wetting agents), for preparing printing inks.

Suitable polyolefin waxes a) are homopolymers of ethylene or propylene, or copolymers of ethylene with one or more 1-olefins, in particular propylene. 1-Olefins used are linear or branched olefins having 2-18 carbon atoms, preferably 3-6 carbon atoms. The 1-olefins may carry an aromatic substitution. Examples of these 1-olefins are ethylene, propylene, 1-butene, 1-hexene, 1-octene and 1-octadecene, and also styrene. Preference is given to homopolymers of ethylene or propylene or copolymers of ethylene with propylene or 1-butene. Where copolymers are used, their ethylene content is preferably 70-99.9% by weight, especially 80-99% by weight. In a further preferred embodiment, the waxes have a molecular weight distribution Mw/Mn<5. Their melt viscosity is preferably between 5 and 100 000 mPas.

Particularly preferred polyolefin waxes are those having a dropping point of between 90 and 165° C., in particular between 100 and 160° C., a melt viscosity at 140° C. (polyethylene waxes) or at 170° C. (polypropylene waxes) of between 10 and 10 000 mPas, in particular between 50 and 5 000 mPas, and a density at 20° C. of between 0.85 and 0.96 g/cm$^3$.

In preferred embodiments, additive b) comprises polytetrafluoroethylene having a molecular weight of between 100 000 and 1 000 000 g/mol.

In preferred embodiments, additive c) comprises thermoplastic polytetrafluoroethylene with particle sizes in the range from 3 to 30 µm.

In preferred embodiments, additive d) comprises amide waxes preparable by reacting ammonia or ethylenediamine with stearic acid, tallow fatty acid, palmitic acid or erucic acid.

Additive e) comprises montan waxes, including acid waxes and ester waxes having a carbon chain length of the carboxylic acid of from $C_{22}$ to $C_{36}$.

The ester waxes comprise preferably reaction products of the montanic acids with monohydric or polyhydric alcohols having 2 to 6 carbon atoms, such as ethanediol, 1,3-butanediol or 1,2,3-propanetriol, for example.

In one preferred embodiment, additive f) comprises carnauba wax.

In preferred embodiments, additive g) comprises reaction products of sorbitol with stearic acid, tallow fatty acid, palmitic acid or erucic acid.

In preferred embodiments, additive h) comprises Fischer-Tropsch waxes.

Additive i) preferably comprises paraffins with dropping points between 48 and 65° C., and microcrystalline waxes with dropping points between 75 and 95° C.

Additive j) comprises polar polyolefin waxes preparable by oxidizing ethylene or propylene homopolymer and copolymer waxes or grafting them with maleic anhydride. For this purpose, particular preference is given to starting from polyolefin waxes having a dropping point of between 90 and 165° C., in particular between 100 and 160° C., a melt viscosity at 140° C. (polyethylene waxes) or at 170° C. (polypropylene waxes) of between 10 and 10 000 mPas, in particular between 50 and 5 000 mPas, and a density at 20° C. of between 0.85 and 0.96 g/cm³.

Additive j) preferably comprises polyamide 6, polyamide 6,6, and polyamide 12. In a further preferred embodiment, the particle size of the polyamides is in the range 3-30 μm.

Additive k) preferably comprises polyolefins, such as, for example, polyethylene, polypropylene or copolymers thereof of high or low density having molecular weights ($M_n$) of between 15 000 to 500 000 g/mol. In a further preferred embodiment the particle size is 3-30 μm.

Additive m) comprises amphiphilic compounds which in general lower the surface tension of liquids, such as, for example, alkyl ethoxylates, fatty alcohol ethoxylates, alkylbenzenesulfonates or betaines.

The mixing ratio of constituent a) to constituents b) to m) may be varied in the range from 1 to 99% by weight a) through to from 1 to 99% by weight b) to m), preferably between 5 and 50%. Where a mixture of two or more of the constituents b) to m) is used, the amount indicated applies to the sum of the amounts of these constituents.

In one preferred embodiment, the above-described waxes are used in micronized form for the purpose of the invention.

The metallocene catalysts for preparing polyolefin waxes are chiral or nonchiral transition metal compounds of the formula $M^1L_x$. The transition metal compound $M^1L_x$ includes at least one central metal atom $M^1$ to which is attached at least one π ligand, e.g., a cyclopentadienyl ligand. Substituents as well, such as halogen, alkyl, alkoxy or aryl groups, may be attached to the central metal atom $M^1$. $M^1$ is preferably an element from main group III, IV, V or VI of the Periodic Table of the Elements, such as Ti, Zr or Hf. By cyclopentadienyl ligands are meant unsubstituted cyclopentadienyl radicals and substituted cyclopentadienyl radicals such as methylcyclopentadienyl, indenyl, 2-methylindenyl, 2-methyl-4-phenylindenyl, tetrahydroindenyl or octahydrofluorenyl radicals. The π ligands may be bridged or unbridged, the possibilities encompassing single and multiple bridges and extending to bridges via ring systems. The term metallocene also embraces compounds containing more than one metallocene fragment, known as polynuclear metallocenes. These metallocenes may have any desired substitution patterns and bridging variants. The individual metallocene fragments of such polynuclear metallocenes may be either identical to or different from one another. Examples of such polynuclear metallocenes are described, for example, in EP-A-0 632 063.

Examples of general structural formulae of metallocenes, and of their activation with a cocatalyst, are given, inter alia in EP-A-0 571 882.

Hereinbelow, the polyolefin waxes from metallocene catalysis are referred to as component 1, and the additives b) to m) as component 2. The mixtures may be prepared by conjointly milling the two components or by mixing the components in liquid-melt phase beforehand and then spraying or milling the mixture.

EXAMPLES

TABLE 1

Physical properties of the test polyolefin waxes

| | Type | Melt viscosity mPas | Dropping point ° C | $M_w/M_n$ | Mn g/mol | Density g/cm³ |
|---|---|---|---|---|---|---|
| Wax 1 | Metallocene ethylene homopolymer wax | 350 at 140° C. | 124 | 2.4 | 990 | 0.965 |
| Wax 2 | Metallocene propylene homopolymer wax | 40 at 170° C. | 135 | 2.1 | 1 870 | 0.880 |
| Comparative sample 1 | Ethylene homopolymer wax, prepared using Ziegler-Natta catalyst | 300 at 140° C. | 125 | 2.8 | 1 500 | 0.970 |

On the basis of wax 1 and wax 2 and also comparative wax 1, the following mixtures were prepared:

TABLE 2

Mixtures of polyolefin waxes with additives

| | Code | Type | Mixing ratio Parts by weight |
|---|---|---|---|
| Mixture 1 | M1 | Wax 1 | 93 |
| | | PTFE | 7 |
| Mixture 2 | M2 | Comparative wax 1 | 93 |
| | | PTFE | 7 |
| Mixture 3 | M3 | Wax 1 | 60 |
| | | Paraflint H2 | 40 |
| Mixture 4 | M4 | Comparative wax 1 | 60 |
| | | Paraflint H2 | 40 |
| Mixture 5 | M5 | Wax 1 | 50 |
| | | Sorbitan tristearate | 50 |
| Mixture 1 | M1 | Wax 1 | 93 |
| | | PTFE | 7 |
| Mixture 6 | M6 | Comparative wax 1 | 50 |
| | | Sorbitan tristearate | 50 |
| Mixture 7 | M7 | Wax 1 | 50 |
| | | Sorbitan trimontanate | 50 |
| Mixture 8 | M8 | Comparative wax 1 | 50 |
| | | Sorbitan trimontanate | 50 |
| Mixture 9 | M9 | Wax 1 | 50 |
| | | Ethylenebisstearoylamide | 50 |
| Mixture 10 | M10 | Comparative wax 1 | 50 |
| | | Ethylenebisstearoylamide | 50 |
| Mixture 11 | M11 | Wax 1 | 80 |
| | | Polar polyethylene wax | 20 |
| Mixture 12 | M12 | Comparative wax 1 | 80 |
| | | Polar polyethylene wax | 20 |

To prepare the mixtures, the pulverulent starting substances were first of all premixed and then comminuted on a fluidized-bed opposed-jet mill from Hosokawa Alpine AG to an average particle size of less than 10 μm. The particle size is measured by the laser diffraction method in an instrument from Malvern. The waxes may be added to the printing ink as a dry powder or, preferably, as a dispersion in binder solution or solvent.

Printing Ink Preparation Examples

1) Offset Ink

The mixtures M1, M2, M3, M4, M9 and M10 were incorporated at 1.5% by weight into an offset ink (Novaboard® cyan 4 C 86, BASF Drucksysteme GmbH) with intensive stirring using a dissolver and subsequent homogenization on a triple-roll mill. A test print (Prüfbau multipurpose test printing machine, System Dr. Dürner) was produced on paper of the Phoenomatt® type, 115 g/m² (Scheufelen GmbH+Co KG), and the scuffing behavior was investigated on a scuff testing instrument (Prüfbau Quartant scuff tester) at a scuffing load of 48 g/cm², scuff rate 15 cm/sec. The parameter assessed was the intensity of the ink transferred to the test sheet after 50, 100 and 200 scuff cycles (strokes) (color difference according to DIN 6174, measured with Hunterlab D 25-2, Hunter) and the damage to the printed image.

TABLE 3

Result of testing in an offset ink with wax incorporated as micropowder

| Example No. | | Particle size $d_{50\,\mu m}$ | Color difference 100 strokes | Color difference 200 strokes | Damage to the printed image |
|---|---|---|---|---|---|
| 1 | Comparative without wax | — | 15.5 | 18.3 | Yes |
| 2 | M1 | 8.0 | 1.2 | 1.8 | No |
| 3 | M2 | 8.5 | 2.0 | 2.4 | No |
| 4 | M3 | 7.8 | 3.5 | 4.2 | No |
| 5 | M4 | 8.0 | 5.2 | 7.6 | Yes |
| 6 | M9 | 6.5 | 3.2 | 4.2 | No |
| 7 | M10 | 6.7 | 5.8 | 8.3 | Yes |

The waxes of the invention result in a lower color difference and thus in improved abrasion resistance.

2) Gravure Ink

The mixtures M3, M4, M5, M6, M7 and M8 were incorporated at 1% by weight into a publication gravure ink (type RR Grav red, Siegwerk Fabenfabrik) with intensive stirring using a dissolver. A test print (gravure test printing instrument LTG 20, Einlehner Prüfmaschinenbau) was produced on paper of the Allgäu type, 60 g/m (G. Haindl'sche Papierfabriken KG), and was tested as for the offset ink example.

TABLE 4

Result of testing in an gravure ink with wax incorporated as micropowder

| Example No. | | Particle size µm | Color difference 100 strokes Masstone | Color difference 100 strokes Halftone | Dynamic friction coefficient µ |
|---|---|---|---|---|---|
| 8 | Comparison without wax | — | 16.7 | 15.1 | 0.53 |
| 9 | M3 (invent.) | 7.5 | 2.9 | 1.8 | 0.33 |
| 10 | M4 (compar.) | 7.6 | 3.4 | 2.2 | 0.35 |
| 11 | M5 (invent.) | 8.5 | 2.0 | 1.1 | 0.27 |
| 12 | M6 (compar.) | 8.5 | 2.5 | 1.7 | 0.28 |
| 13 | M7 (invent.) | 8.4 | 2.6 | 1.2 | 0.26 |
| 14 | M8 (compar.) | 8.3 | 3.1 | 1.8 | 0.27 |

The waxes of the invention result in a lower color difference and thus in improved abrasion resistance. Also found, surprisingly, was the reduction in the sliding friction when sorbitan esters were added.

3) Flexographic Ink

The mixtures M3, M4, M5, M6, M7, M8, M11 and M12 were incorporated at 1% by weight into an aqueous flexographic ink with intensive stirring using a dissolver. The flexographic printing ink had the composition 35% by weight Synthacryl® SW 175, 20% by weight Hostapermblau® B2G, 45% by weight water. A test print was prepared by applying the ink with a wet film thickness of 6 µm using a wire-wound coating bar to paper of type Allgäu 80 g/m² (G. Haindl'sche Papierfabriken KG) and was tested as for the set ink example.

TABLE 5

Result of testing in a flexographic ink with wax incorporated as micropowder

| Example No. | | Particle size µm | Color difference 50 strokes | Dynamic friction coefficient µ |
|---|---|---|---|---|
| 15 | Comparison without wax | — | 7.4 | 0.37 |
| 16 | M3 (invent.) | 7.5 | 3.8 | 0.23 |
| 17 | M4 (compar.) | 7.6 | 4.4 | 0.25 |
| 18 | M5 (invent.) | 8.5 | 3.0 | 0.18 |
| 19 | M6 (compar.) | 8.5 | 3.7 | 0.19 |
| 20 | M7 (invent.) | 8.4 | 2.8 | 0.16 |
| 21 | M8 (compar.) | 8.3 | 3.1 | 0.17 |
| 22 | M11 (invent.) | 8.6 | 3.1 | 0.23 |
| 23 | M12 (compar.) | 8.5 | 3.9 | 0.24 |

The waxes of the invention result in a lower color difference and thus in improved abrasion resistance. Also found, surprisingly, was the reduction in the sliding friction when sorbitan esters were added.

The invention claimed is:

1. A method for preparing a printing ink comprising the step of adding to the printing ink a mixture comprising:
   a) homopolymer or copolymer of $C_2$-$C_{18}$ α-olefins, prepared using metallocene catalysis, and also degradation waxes, prepared from longer-chain polyolefins produced using metallocene catalysis, with one or more further additives selected from the group consisting of
   b) polytetrafluoroethylene having a molecular weight ($M_n$) of between 30 000 and 2 000 000 g/mol,
   c) thermoplastic PTFE having a molecular weight (Mn) of between 500 000 and 10 000 000 g/mol, whose particle size is situated in the range 1-100 µm,
   d) amide waxes prepared by reacting ammonia or ethylenediamine with saturated and unsaturated fatty acids,
   e) montan waxes, including acid waxes and ester waxes having a carbon chain length of the carboxylic acid of from $C_{22}$ to $C_{36}$,
   f) natural plant waxes,
   g) reaction products of sorbitol with saturated and/or unsaturated fatty acids and/or montanic acids,
   h) synthetic hydrocarbons,
   i) paraffins and microcrystalline waxes obtained in the course of petroleum refining,
   j) polar polyolefin waxes prepared by oxidizing ethylene or propylene homopolymer and copolymer waxes or grafting them with maleic anhydride,
   k) polyamides whose particle size is situated in the range 1-100 µm.
   l) polyolefins or copolymers thereof of high or low density having molecular weights (Mn) of between 10 000 and 1 000 000 g/mol whose particle size is situated in the range 1-100 µm, m) agents which lower the surface tension of liquids (wetting agents).

2. The method as claimed in claim 1, wherein constituent a) is an ethylene homopolymer or copolymer wax and said degradation waxes.

3. The method as claimed in claim 1, wherein constituent a) is a propylene homopolymer or copolymer wax and said degradation waxes.

4. The method as claimed in claim 1, wherein the polar polyolefin waxes of component i) have a molecular weight distribution $M_w/M_n<5$.

5. The method as claimed in claim 1, wherein the polar polyolefin waxes of component i) have a melt viscosity of from 5 to 100 000 mPas.

6. The method as claimed in claim 1 wherein the polar polyolefin waxes of component i) have a dropping point of from 70 to 165° C.

7. The method as claimed in claim 1, wherein the fraction of the further additive b) through m) is 1-99% by weight based on the overall mass of the mixture.

8. The method as claimed in claim 1, wherein the waxes degradation waxes and the waxes of components d), e), f), and j) are used in micronized form.

9. A printing ink prepared in accordance with the method of claim 1.

10. A method for preparing a printing ink comprising the step of adding to the printing ink a mixture comprising:
   a) at least one degradation wax, prepared from longer-chain polyolefins produced using metallocene catalysis, with one or more further additives selected from the group consisting of
      b) polytetrafluoroethylene having a molecular weight ($M_n$) of between 30 000 and 2 000 000 g/mol,
      c) thermoplastic PTFE having a molecular weight (Mn) of between 500 000 and 10 000 000 g/mol, whose particle size is situated in the range 1-100 μm,
      d) amide waxes prepared by reacting ammonia or ethylenediamine with saturated and unsaturated fatty acids,
      e) montan waxes, including acid waxes and ester waxes having a carbon chain length of the carboxylic acid of from $C_{22}$ to $C_{36}$,
      f) natural plant waxes,
      g) reaction products of sorbitol with saturated and/or unsaturated fatty acids and/or montanic acids,
      h) synthetic hydrocarbons,
      i) paraffins and microcrystalline waxes obtained in the course of petroleum refining,
      j) polar polyolefin waxes prepared by oxidizing ethylene or propylene homopolymer and copolymer waxes or grafting them with maleic anhydride,
      k) polyamides whose particle size is situated in the range 1-100 μm,
      l) polyolefins or copolymers thereof of high or low density having molecular weights (Mn) of between 10 000 and 1 000 000 g/mol whose particle size is situated in the range 1-100 μm,
      m) agents which lower the surface tension of liquids (wetting agents).

* * * * *